United States Patent
Maillot

(10) Patent No.: US 7,742,060 B2
(45) Date of Patent: Jun. 22, 2010

(54) SAMPLING METHODS SUITED FOR GRAPHICS HARDWARE ACCELERATION

(75) Inventor: Jérôme Maillot, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 483 days.

(21) Appl. No.: 11/534,559

(22) Filed: Sep. 22, 2006

(65) Prior Publication Data

US 2008/0074438 A1   Mar. 27, 2008

(51) Int. Cl.
*G09G 5/00* (2006.01)
(52) U.S. Cl. ............... 345/611; 345/418; 345/581; 382/269
(58) Field of Classification Search ........... 345/612, 345/613, 611, 418, 581; 382/269
See application file for complete search history.

(56) References Cited

U.S. PATENT DOCUMENTS

| | | | |
|---|---|---|---|
| 4,897,806 A | 1/1990 | Cook et al. | |
| 5,025,400 A | 6/1991 | Cook et al. | |
| 5,239,624 A | 8/1993 | Cook et al. | |
| 6,525,723 B1 * | 2/2003 | Deering | 345/419 |
| 6,529,193 B1 | 3/2003 | Herken et al. | |
| 6,922,199 B2 * | 7/2005 | Hunter | 345/611 |
| 7,071,938 B2 | 7/2006 | Herken et al. | |
| 2002/0070944 A1 | 6/2002 | Deering | |
| 2003/0034992 A1 | 2/2003 | Elliot et al. | |
| 2003/0201994 A1 | 10/2003 | Taylor et al. | |
| 2008/0012878 A1 * | 1/2008 | Nystad et al. | 345/613 |

OTHER PUBLICATIONS

The OpenGL Programming Guide : The Official Guide to Learning OpenGL, Release 1.1. 2nd ed. New York: Addison-Wesley Longman, Limited, 1997.*

* cited by examiner

*Primary Examiner*—Xiao M Wu
*Assistant Examiner*—Scott E Sonners
(74) *Attorney, Agent, or Firm*—Patterson & Sheridan, LLP

(57) ABSTRACT

Embodiments of the invention provide sampling methods suited for graphics hardware acceleration. A graphics application may specify a grid of pixels to be rendered. The graphics application may supply a graphics rendering engine with one or more sets of camera parameters. Each set of camera parameters is used to alter the position of the pixel grid relative its original position so that a grid of samples can be generated at the new grid position. The graphics rendering engine then renders a grid of samples at the new grid position. Each sample grid may be used sampled to determine a set of intermediate color values that may be blended together to generate a final color value for each pixel in the pixel grid.

29 Claims, 6 Drawing Sheets

US 7,742,060 B2

SAMPLING METHODS SUITED FOR GRAPHICS HARDWARE ACCELERATION

BACKGROUND OF THE INVENTION

1. Field of the Invention

The present invention generally relates to graphics processing. More specifically, the present invention relates to techniques for rendering an image using sampling methods suited for graphics hardware acceleration.

2. Description of the Related Art

In computer graphics, rendering is the process of determining color values of the pixels of a two dimensional graphics image based on a three-dimensional graphics scene typically generated by a graphics application. When graphics images are rendered, various artifacts, such as jagged edges, may ultimately appear in the image. A number of anti-aliasing techniques exist that "blend" the colors of pixels adjacent to one another in an image to mask artifacts in the image. For example, such blending can make jagged edges appear smoother to the human eye. Typical anti-aliasing techniques use multiple color values or samples to determine the final color value of each pixel in the graphics image so that there is a more gradual transition between the different objects and colors in the graphics image.

Currently, random and pseudo random sampling methods have been used to reduce aliasing effects when generating images using a software-based rendering engine. This approach has the advantage of using a random sampling pattern for anti-aliasing so that the sampling frequencies are less likely to correlate with the spatial frequencies in the graphics image, but requires that the image be rendered by software routines that execute on a general purpose central processing unit (CPU). While effective, the software approach is significantly slower than using hardware based rendering techniques.

In contrast to software renderers, dedicated graphics processing units (GPUs) typically use a fixed sampling pattern to perform anti-aliasing operations. GPUs are specifically designed to process image data much more quickly than a CPU. However, the sampling patterns used by GPUs may introduce moiré, ringing, or animation artifacts for some images. Moiré effects are most often generated when the sampling frequency of the anti-aliasing grid pattern correlates with one or more spatial frequencies present in the graphics image. For example, images that include regular patterns such as roof lines or brick walls, checkerboards, or any other repeating pattern in an image may lead to moiré effects when using anti-aliasing techniques that rely on grid-based sampling.

Accordingly, what is needed in the art is a sampling technique suited for graphics hardware acceleration that is not as prone to artifacts, such as moiré effects, as current hardware-based sampling techniques.

SUMMARY OF THE INVENTION

Embodiments of the invention provide an anti-aliasing sampling method suited for graphics hardware acceleration.

One embodiment of the invention includes a method for determining color values for pixels in a graphics image. The method generally includes receiving an initial location of a pixel grid and one or more sets of camera parameters. Each set of camera parameters may be used to perturb the initial location of the pixel grid to define a sample grid. The method further includes rendering each sample grid to a generate a color value for each sample within each sample grid and sampling each sample grid to determine a set of intermediate color values for each pixel in the pixel grid. The sets of intermediate color values may then be combined to generate a final color value for each pixel in the pixel grid. For example, in a particular embodiment, as each sample grid is sampled to determine the set of intermediate color values, accumulating the set of intermediate color values for each pixel in the pixel grid in a memory buffer. After each of the sample grids is sampled, the accumulated value for each pixel may be divided by the number of sample grids to determine a final color value for each pixel in the pixel grid.

Another embodiment of the invention includes a computing device configured to generate color values for pixels in a graphics image. The computing device may generally include a central processing unit coupled to a system memory and a graphics processing unit coupled to the central processing unit and including a graphics rendering pipeline. The graphics rendering pipeline may be configured receive an initial location of a pixel grid and one or more sets of camera parameters. Each set of camera parameters may be used to perturb the initial location of the pixel grid to define a sample grid. The graphics rendering pipeline may be further configured to render each sample grid to generate a color value for each sample within each sample grid, sample each sample grid to determine a set of intermediate color values for each pixel in the pixel grid, and combine the intermediate color values in each set of intermediate color values to generate a final color value for each pixel in the pixel grid.

Advantageously, embodiments of the invention provide an anti-aliasing technique that leverages the rendering speed of hardware graphics pipeline, without relying on a regular grid or repeating pattern to generate a color value for a given pixel. Thus, not only is overall performance generally increased relative to prior art software rendering techniques, the occurrence of moiré effects and other artifacts may be reduced, thereby increasing overall image quality relative to prior art rendering techniques.

DETAILED DESCRIPTION OF THE PREFERRED EMBODIMENTS

Embodiments of the invention provide sampling methods suited for graphics hardware acceleration. In one embodiment, a graphics application specifies a grid of pixels to be rendered, where the pixel grid represents a portion of a two-dimensional graphics image being rendered from a three-dimensional graphics scene generated by the graphics application. The graphics application may be configured to supply one or more sets of camera parameters. Alternatively, sets of camera parameters may be determined by a graphics driver or even the by graphics hardware directly. Each set of camera parameters is used to alter the position of the pixel grid relative to its original position so that a grid of samples can be generated at the new grid position. For example, the camera parameters may specify to translate, rotate, scale and/or skew the original pixel grid. A graphics rendering engine then renders a grid of samples at the new grid position. The values of the different samples in a particular sample grid reflect the colors of the three-dimensional graphics scene at a camera position defined by the set of camera parameters associated with the sample grid. A final rendering step is then performed where each sample grid is sampled to determine a set of intermediate color values for each pixel in the pixel grid. The intermediate color values are blended together to generate a final color value for each pixel in the original pixel grid. Alternatively, sample grids may be accumulated into single storage location as each sample grid is rendered. Once intermediate values for each of the sample grids has been accumulated, the resulting values may be divided by the number of sample grids to generate a final color value for each pixel in the original pixel grid.

This rendering technique enables standard graphics hardware to implement a sampling pattern when rendering a set of pixels that is more irregular than the sampling patterns typically implemented by the hardware. Irregular sampling patterns reduce the incidence of moiré effects and other artifacts in rendered graphics images since the likelihood of having a sampling frequency that strongly correlates with a spatial frequency of a rendered graphics image is substantially reduced. Thus, overall image quality is enhanced. At the same time, however, a graphics rendering engine may quickly manipulate and render the various sample grids, thereby maintaining overall system performance. This is particularly the case for graphics hardware having multiple graphics pipelines, allowing multiple sample grids to be rendered simultaneously.

Figure 1:
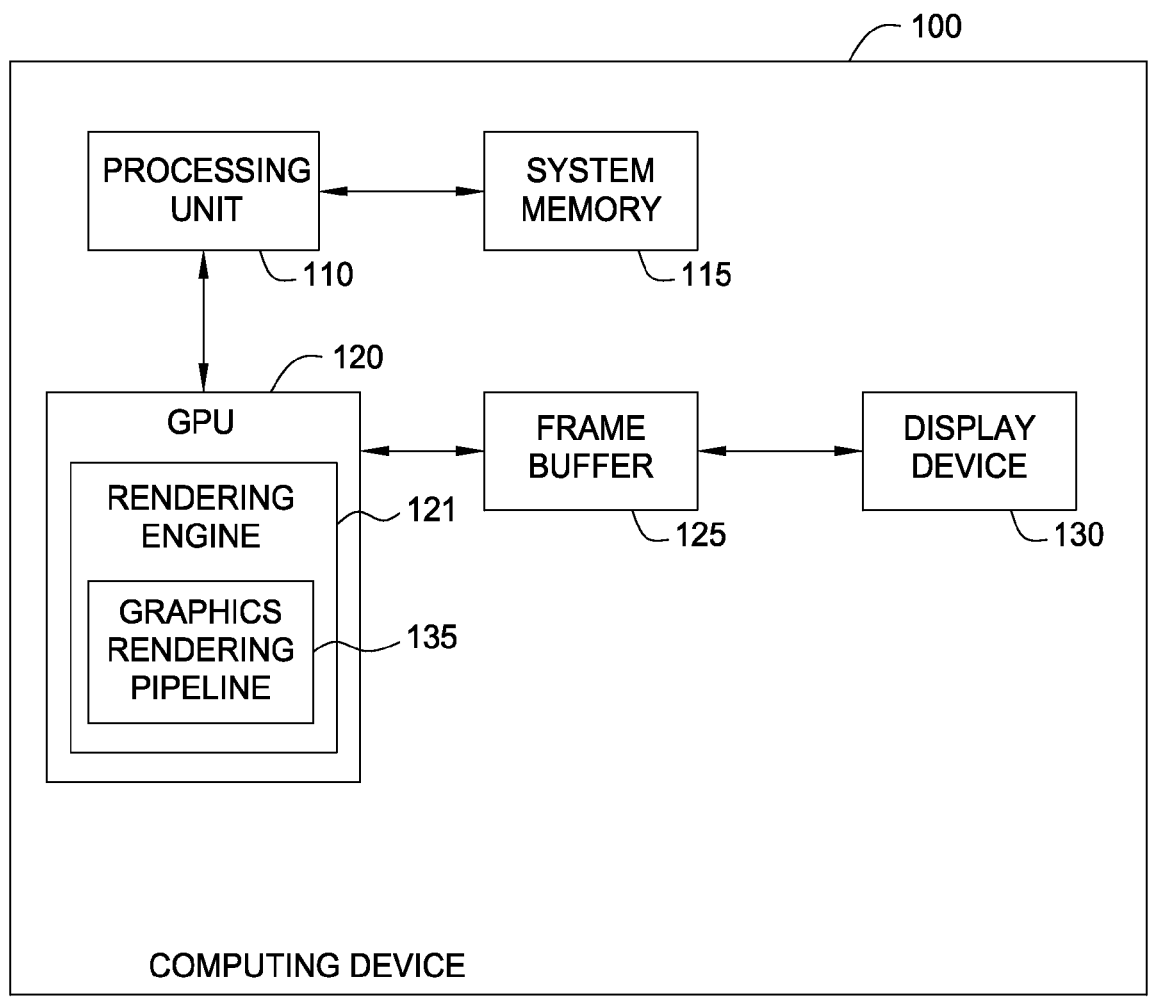
FIG. 1 is a block diagram illustrating an exemplary architecture for a computing device, according to one embodiment of the invention.

FIG. 1 is a block diagram illustrating an exemplary architecture for a computing device 100, according to one embodiment of the invention.

As shown, computing device 100 includes, without limitation, a central processing unit (CPU) 110 connected to a system memory 115, a graphics processing unit (GPU) 120, and a frame buffer 125 connected to GPU 120 and to a display device 130. GPU 120 includes at least one rendering engine 121 that incorporates at least one graphics rendering pipeline 135 used to process graphics data. Frame buffer 125 stores data processed by GPU 120. When a display frame is completed, the contents of frame buffer 125 may be output to display device 130 for display. Typically, display device 130 is a CRT or LCD display. Persons skilled in the art will recognize that any system having one or more processing units configured to implement the teachings disclosed herein falls within the scope of the present invention. For example, computing device 100 may be, without limitation, a desk-top computer, a laptop computer, a mobile telephone, a set-top box or a personal digital assistant device. Thus, the architecture of computing device 100 in no way limits the scope of the present invention.

Figure 2:
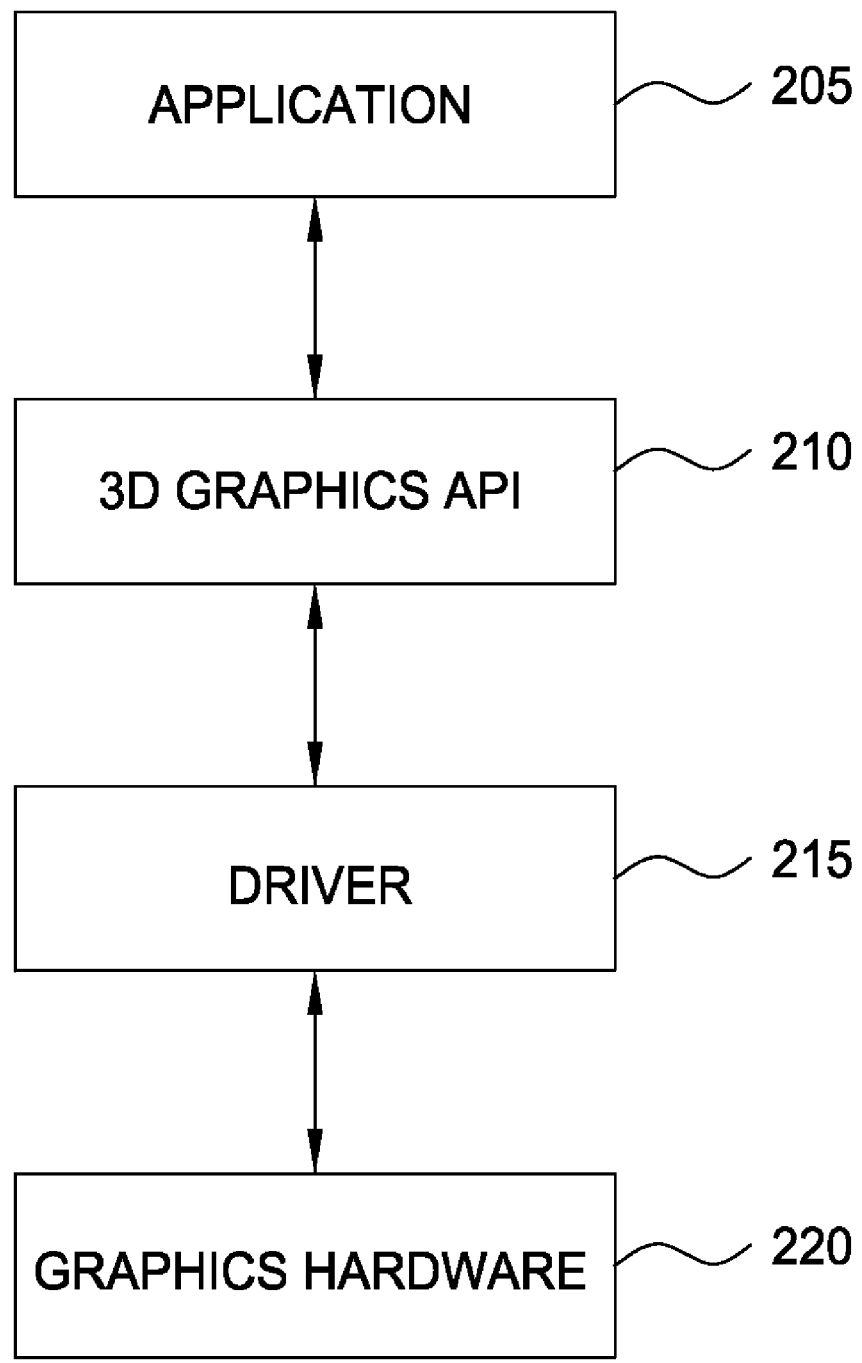
FIG. 2 is a block diagram illustrating the relationship between a graphics application and underlying graphics hardware, according to one embodiment of the invention.

FIG. 2 is a block diagram illustrating the relationship between a graphics application 205 and underlying graphics hardware 220, according to one embodiment of the invention. Graphics application 205 is representative of any computer software application configured to produce a two-dimensional or three-dimensional graphics scene for rendering by graphics hardware 220. Common examples of a graphics application 205 include video games, computer aided design tools, digital photo editing and display tools, medical imaging applications, and digital video players, to name but a few.

Graphics application 205 may include calls to a graphics application programming interface (API) 210. Well-known graphics API's include the OpenGL® and Direct3D® APIs, however, no particular graphics API 210 is required for the present invention. Graphics API 210 provides a collection of function calls and data structures to graphics application 205 that may be used to draw and manipulate complex two-dimensional or three-dimensional scenes from simple primitives. In turn, a driver 215 implements the functions and data structures defined by graphics API 210 for a particular set of graphics hardware 220. Thus, graphics API 210 provides a common interface which allows any application 205 that uses the functions of graphics API 210 to run on any graphics hardware 220 with a driver written to graphics API 210.

One family of functions provided by graphics API 210 may allow an application developer to supply a set of camera parameters used to control the location of a pixel grid, within the graphics scene being generated by graphics application 205. In one embodiment, multiple sets of camera parameters are each used to perturb the position of the pixel grid relative its original position. The camera parameters may specify any combination of rotation, translation, scaling, or skewing that should be used to alter the location of the pixel grid. The resulting translated, rotated, and/or scaled pixel grid is referred to herein as a sample grid. As is well-understood, by changing the position of the camera within the graphics scene, the color values generated when a particular sample grid is rendered may change relative to the color values that would have been genreated had the pixel grid been rendered at its original position. Alternatively, graphics API 210 may expose some of the camera parameters to the application, while computing others internally. For example, graphics API 210 may allow graphics application 205 to set the number of sample grids, but compute random rotation translation scale internally. Of course, other combinations of camera parameters that may be specified through graphics API 210 may be appropriate for a particular case. As described in greater detail herein, the color values for the pixels in the original pixel grid may be determined by combining intermediate color values that are generated by sampling each of the sample grids created from the sets of camera parameters. Further, even though each sample grid may have a regular geometric pattern, the combination of samples in the different sample grids used to determine the final color value for a pixel in the pixel grid has a pseudo-random quality, thereby reducing moiré and other artifacts in the rendered graphics image.

Figure 3A:
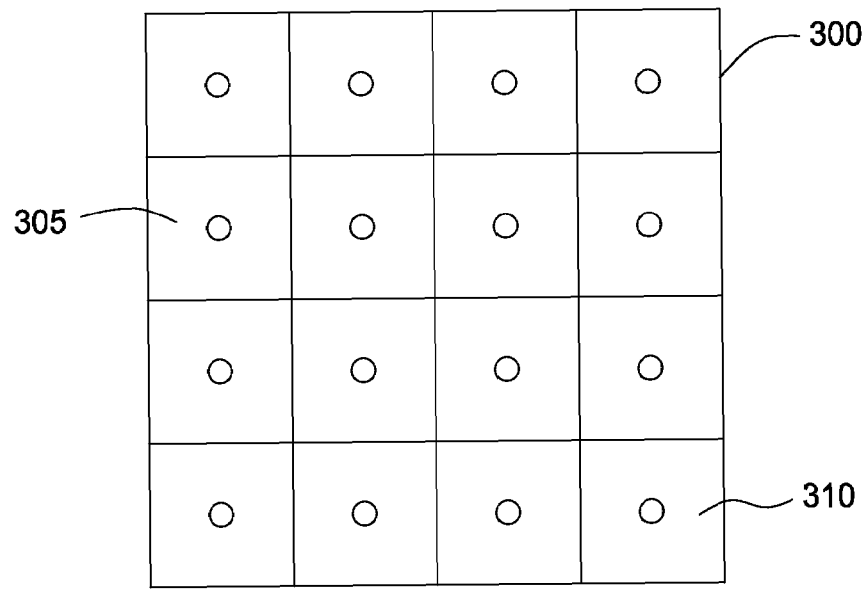
FIGS. 3A and 3B are conceptual illustrations showing a grid in of pixels in a first location, and a grid of samples in a second, perturbed location, according to one embodiment of the invention.
Figure 3B:
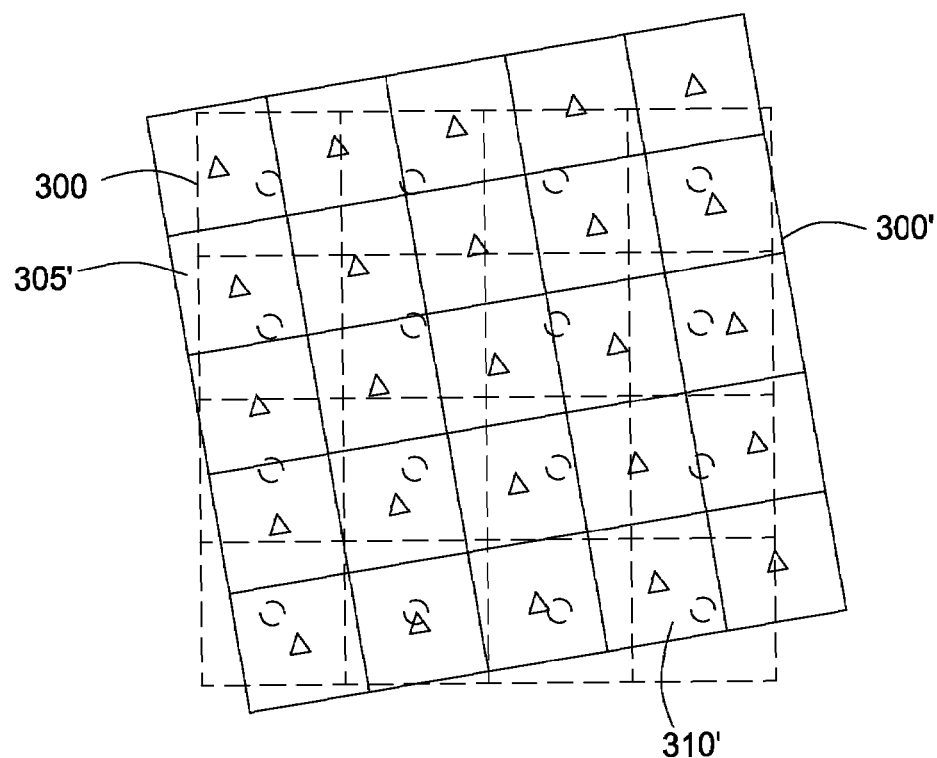

FIGS. 3A and 3B show an example of a pixel grid in an initial position and a perturbed position, according to one embodiment of the invention. Pixel grid 300 of FIG. 3A is a 4×4 grid of pixels. As is known, pixels in pixel grid 300 may be represented using (x, y, z) coordinates and a (r, g, b, a) color values. Generally, the locations of the pixels within grid 300 map to locations within the graphics scene being generated by graphics application 205. During the rendering process, color values for the pixels in pixel grid 300 are generated. As stated, a set of camera parameters may be used to alter the location of pixel grid 300 from its original position to define a sample grid. The amount of translation, rotation, scaling, and/or skewing used to perturb pixel grid 300 from its original position may be designated by the graphics developer via graphics application 205. Alternatively, different sets of camera parameters may be determined by graphics API 210, graphics driver 215 or even the by graphics hardware 220 directly.

FIG. 3B is a conceptual illustration of pixel grid 300 having been perturbed by a set of camera parameters to define a sample grid 300'. Illustratively, pixel grid 300 is a 5×5 grid shown translated down and to the right relative to the original position of pixel grid 300 as well as having been rotated a counter-clockwise about the original center of grid 300. By using a sample grid with a higher resolution than pixel grid 300, the pixels of pixel grid 300 are more likely to be covered by at least some portion of sample grid 300'. In one embodiment, the set camera parameters for a given sample grid may specify a grid resolution to use for that sample grid.

As shown, the positions of pixels 305 and 310 in pixel grid 300 have moved from initial positions to the ones shown by samples 305' and 310' in sample grid 300'. When sample grid 300' is rendered, the color values generated for samples 305' and 310' may be different than the color values that would be generated for pixels 305 and 310 by rendering pixel grid 300. The color values generated for samples 305' and 310', along with intermediate color values generated from additional sample grids are used to determine a final color value for each pixel in pixel grid 300.

Figure 4A:
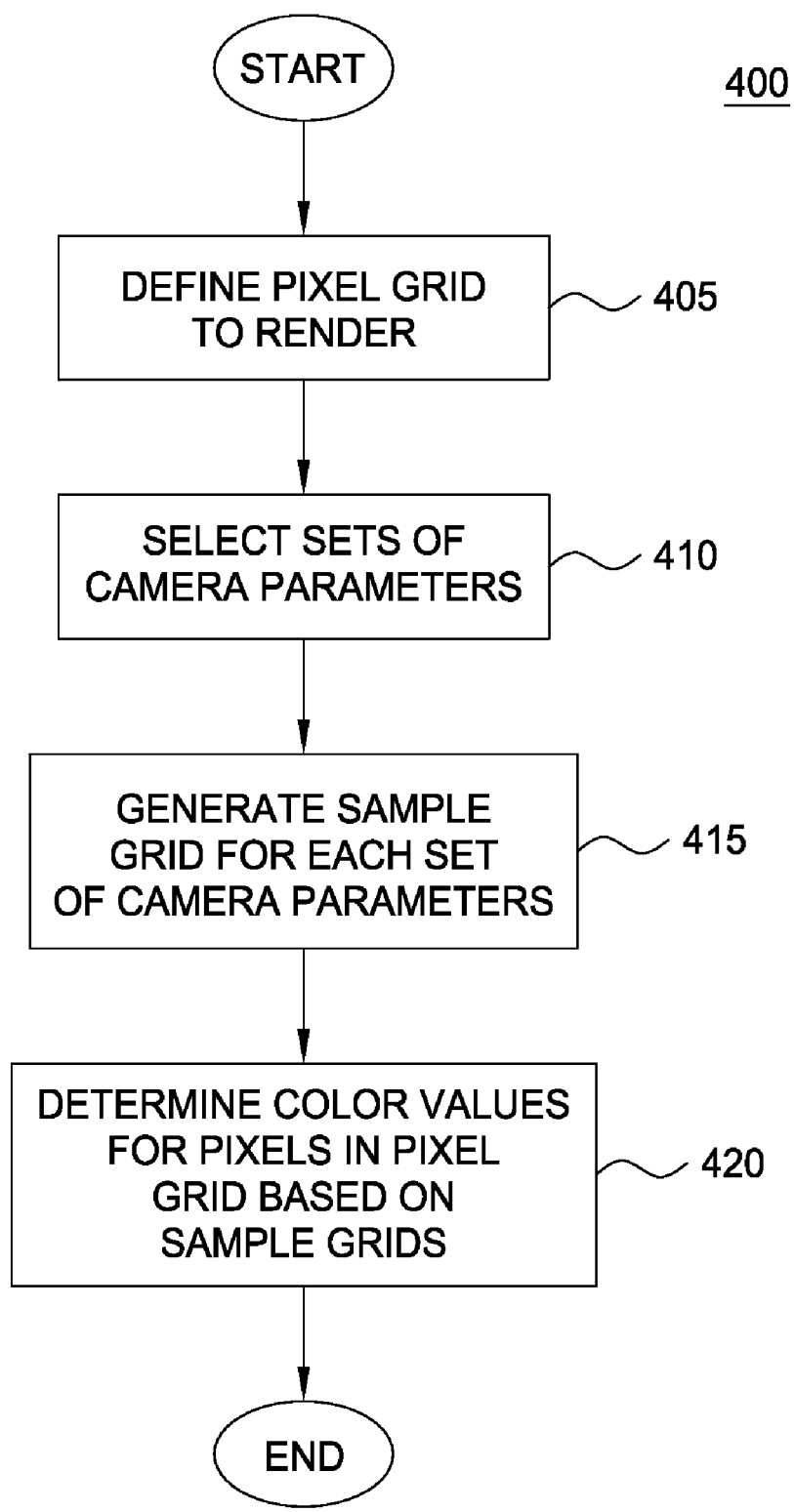
FIG. 4A illustrates a method for determining color values for pixels in a graphics image, according to one embodiment of the invention.

FIG. 4A illustrates a method 400 for determining the color values for the pixels in a pixel grid, according to one embodiment of the invention. More specifically, the method 400 may be used to render the portion of an image covered by a pixel grid, e.g., grid 300 shown in FIG. 3A. Persons skilled in the art will understand that any system configured to perform the method 400 shown in FIG. 4, in any order, is within the scope of the present invention.

Method 400 begins at step 405 where the pixel grid to be rendered is defined. The pixel grid may encompass any selection of pixels up to and including the complete display resolution of a screen image to be generated. Alternatively, a developer may identify regions of an image where moiré or other anti-aliasing artifacts are occurring and define a pixel grid to encompass such regions. The ultimate size of the pixel grid and associated sample grids is generally limited only the capability of the graphics hardware.

At step 410, one or more sets of camera parameters may be supplied to perturb the location of the pixel grid defined at step 405 from its initial location. Each set of camera parameters is supplied by an end-user through a graphics application, such as graphics application 205, and may include any combination of parameters used to translate, rotate and/or scale the pixel grid defined at step 405. Note, although the example below uses three sets of camera parameters, any number may be used so long as the resulting number of sample grids can be supported by the graphics hardware.

At step 415, a graphics rendering pipeline, such as the graphics rendering pipeline 135, may be used to generate a sample grid for each set of camera parameters. Each sample grid is defined relative to the original pixel grid defined in step 405 by perturbing the pixel grid from its original coordinate position based on the camera parameters associated with the sample grid being generated. Once defined, graphics rendering pipeline may be used to render the sample grid. During the rendering process, color values for the different samples in the sample grid are generated. As each sample grid is rendered, the color values of the samples in the sample grid are stored in a memory local to the GPU, such as frame buffer 125. Additionally, graphics hardware commonly provides multiple graphics rendering pipelines. In such a case, multiple sample grids may be passed to different pipelines for parallel rendering.

At step 420, the final color value for each pixel in the pixel grid is computed by sampling each of the sample grids generated in step 415 in a final rendering pass and blending the results. The type of sampling used is determined by the sampling functionality implemented in the graphics rendering pipeline. For example, if the graphics hardware implements a simple point sampling algorithm, then, for each pixel in the pixel grid, the color value of the sample in each sample grid located closest to the pixel is assigned to the pixel, producing a plurality of intermediate color values for the pixel. In the case where there are three sample grids for each pixel, three intermediate color values are generated. The intermediate color values are then weighted and blended to compute the final color value for the pixel.

In alternative embodiments, the graphics hardware may implement more complicated sampling algorithms, such as bilinear or trilinear sampling. For example, if bilinear sampling is used, then, for each pixel, the color values of the four samples in each sample grid located closest to the pixel are blended together using bilinear filtering techniques to produce a plurality of intermediate color values for the pixel. Again, in the case where there are three sample grids for each pixel, three intermediate color values are generated. The intermediate color values are then weighted and blended to compute the final color value for the pixel. As persons skilled in the art will appreciate, the type of sampling functionality implemented by the graphics rendering pipeline in no way limits the scope of the present invention.

Figure 4B:
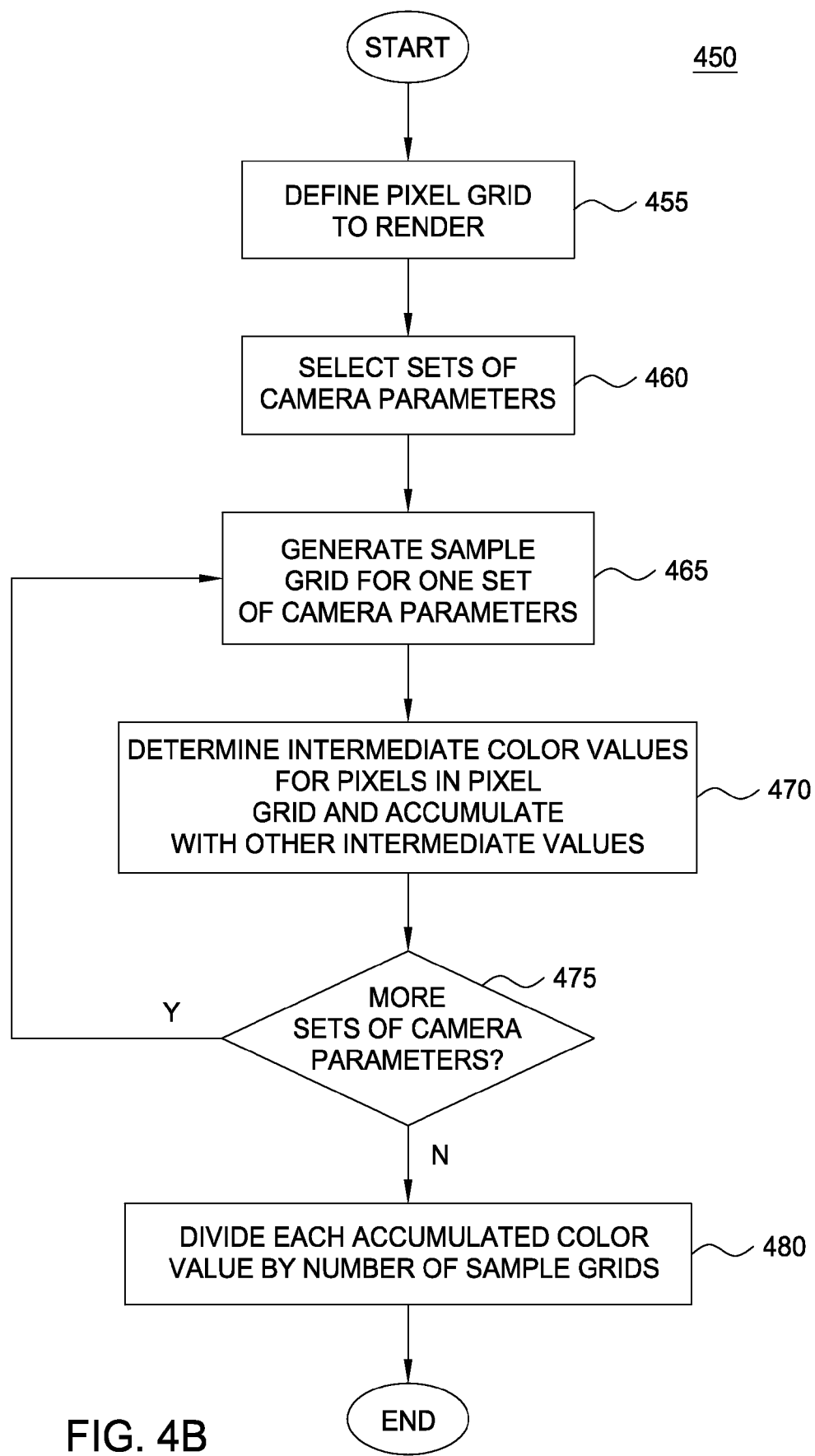
FIG. 4B illustrates another method for determining color values for pixels in a graphics image, according to one embodiment of the invention

FIG. 4B illustrates a method 450 for determining color values for pixels in a graphics image, according to one embodiment of the invention. The method 450 begins with steps 455 and 460, which correspond to steps 405 and 410 of the method 400, described above. Thereafter, a loop begins to process each sample grid and accumulate the results generated from each one. Also, as stated above, if the graphics hardware provides multiple graphics rendering pipelines, then multiple sample grids may be processed in parallel.

At step 465, a sample grid is rendered for one set of camera parameters. At step 470, the sample grid is sampled to determine an intermediate value for each of the pixels in the original pixel grid. The results may be accumulated into a memory local to the GPU, such as frame buffer 125. In one embodiment, before being accumulated into memory, each sample grid may be filtered. For example, a small blur (e.g., with a radius between 1-2 pixels) may help to further reduce the occurrence of moiré and/or animation artifacts.

At step 475, if more sets of camera parameters remain, the method 450 returns to step 465 and repeats steps 465 and 470 for another set of camera parameters. At step 480, once each sample grid has been rendered and the results stored in memory, the final color values for the pixels in the original pixel grid may be determined by dividing the accumulated values by the number of sample grids. Advantageously, this approach requires the use of only a single additional buffer, regardless of the number of sample grids used.

Figure 5:
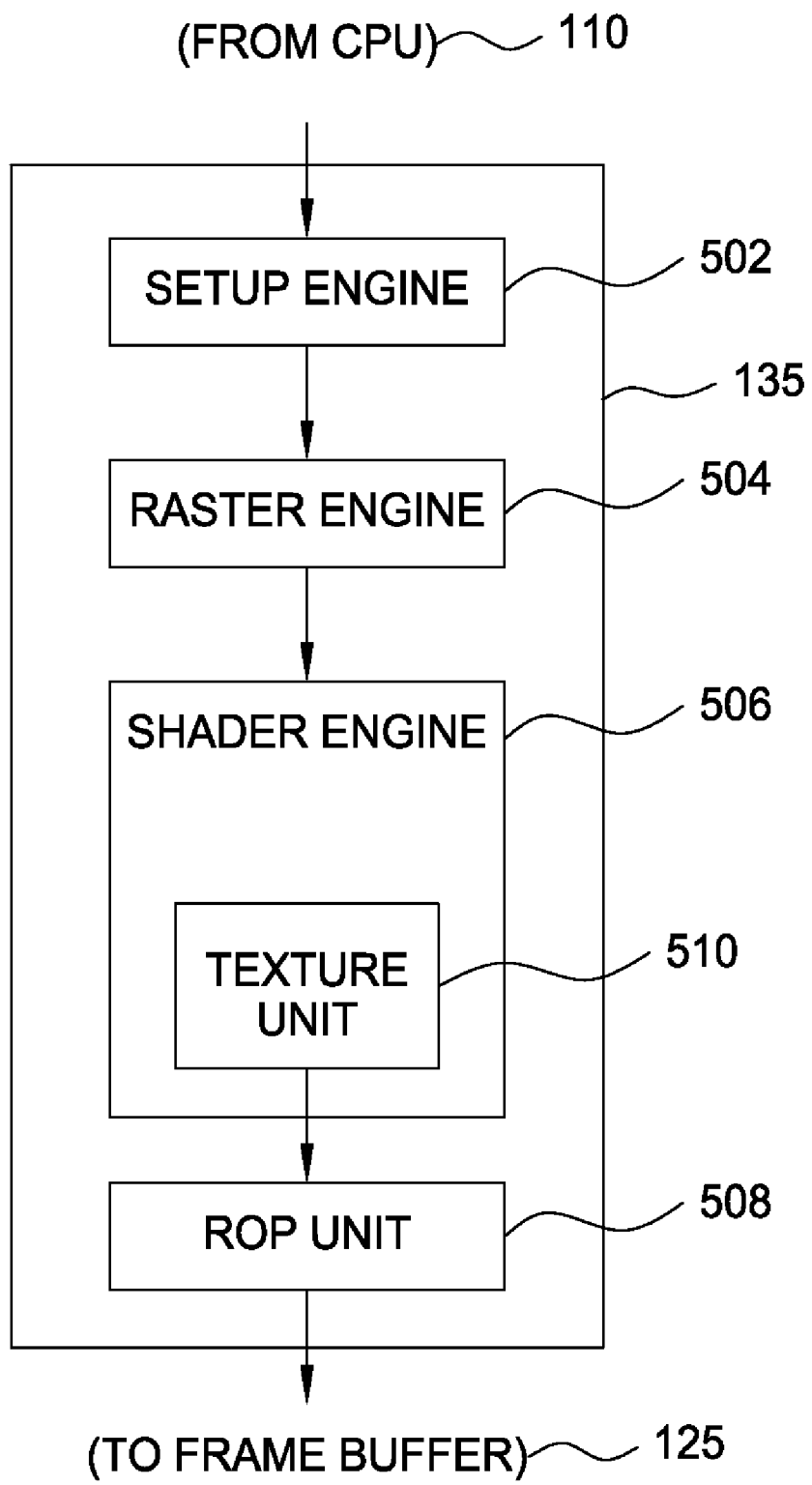
FIG. 5 illustrates an exemplary graphics rendering pipeline, according to one embodiment of the invention.

FIG. 5 is a conceptual diagram of a graphics rendering pipeline 135, according to one embodiment of the invention. As shown, FIG. 5 illustrates a single graphics rendering pipeline 135; however, one of ordinary skill in the art will understand that graphics hardware commonly includes multiple graphics rendering pipelines that operate in parallel. As shown, setup engine 502 is the entry point into graphics rendering pipeline 135. Setup engine 502 receives geometry primitives, typically triangles, from a graphics application 205 and performs geometric transforms as specified by the graphics application. In one embodiment, the graphics application may specify the location and size of a pixel grid, the number of sample grids to use in the rendering process based on the number of different sets of camera parameters input by the end-user, and the camera parameters used to perturb the location of the original pixel grid for each sample grid.

The output of setup engine 502 includes triangles transformed and projected onto a two dimensional surface, sometimes referred to as "screen space," corresponding to a window on the viewer's screen. As described above, the content of the "screen space" depends, at least in part, on the position of the camera. The geometric primitives in screen space emitted by setup engine 502 are decomposed by rasterization engine 504 into fragments, corresponding to screen space pixels that are least partially covered by the geometric primitives. Additionally, rasterization engine 504 may be configured to determine the screen space coverage and alignment of each geometric primitive.

Shader engine 506 receives fragments from rasterization block 504 and processes the fragments according to shading instructions specified by the graphics application. The processed fragments may be transmitted to Raster OPerations (ROP) block 508 for further processing. ROP block 508 conducts any depth and stencil testing on the shaded pixels, as specified by the graphics application. Pixels surviving depth and stencil testing are written to frame buffer 125. Then a video refresh element (not shown) scans data stored in frame buffer 125 out to display device 130 of FIG. 1.

Persons skilled in the art will understand that the different sample grids described herein may be genreated in step 415 of FIG. 4 by passing the pixel grid defined in step 405 through the graphics rendering pipeline 135 along with each of the sets of camera parameters designated in step 410. As shown in FIG. 5, shader engine 506 includes a texture unit 510 that is configured to sample the different sample grids to generate the set of intermediate color values for each pixel of the pixel grid, as set forth in step 415 of FIG. 4. Additionally, texture unit 510 is further configured to perform the blending or weighting process to determine the final color value for each pixel in the pixel grid, as set forth in step 420 of FIG. 4.

Advantageously, embodiments of the invention provide an anti-aliasing technique that leverages the rendering speed of hardware graphics pipeline, without relying on a regular grid or repeating pattern to generate a color value for a given pixel. Thus, not only is overall performance generally increased relative to prior art software rendering techniques, the occurrence of moiré effects and other artifacts may be reduced, thereby increasing overall image quality relative to prior art hardware rendering techniques.

While the foregoing is directed to embodiments of the present invention, other and further embodiments of the invention may be devised without departing from the basic scope thereof, and the scope thereof is determined by the claims that follow.

What is claimed is:

1. A computer-implemented method for determining color values for pixels in a graphics image, the method comprising:
   receiving an initial location of a pixel grid associated with the graphics image;
   receiving a first set of camera parameters via a first user interface displayed on a display device;
   computing a second set of camera parameters based on configuration information related to changes in the location of the pixel grid and the initial location of the pixel grid;
   combining the first set of camera parameters and the second set of camera parameters to determine a new location of the pixel grid;
   generating a first sample grid based on the new location of the pixel grid, wherein the first sample grid includes a set of samples corresponding to the pixels in the graphics image;
   rendering the first sample grid to determine a color value for each sample included in the set of samples;
   sampling the first sample grid to determine a first set of intermediate color values for the pixels in the graphics image based on the color values for each sample in the set of samples;
   computing a final pixel value for a first pixel in the graphics image based on a first intermediate color value included in the first set of intermediate color values and associated with the first pixel; and
   displaying the first pixel having a color corresponding to the final pixel value on the display device.

2. The method of claim 1, wherein a first camera parameter is a translation parameter.

3. The method of claim 1, wherein a first camera parameter is a rotation parameter.

4. The method of claim 1, wherein a first camera parameter is a scaling parameter.

5. The method of claim 1, wherein a first camera parameter is a skewing parameter.

6. The method of claim 1, wherein a first camera parameter specifies a sampling resolution for the sample grid.

7. The method of claim 1, wherein the first set of camera parameters includes a combination of translation, rotation, scaling and/or skewing parameters.

8. The method of claim 1, further comprising the step of, filtering the first sample grid.

9. The method of claim 1, wherein the step of sampling comprises performing a point sampling operation.

10. The method of claim 1, wherein the step of sampling comprises performing a bilinear sampling operation.

11. The method of claim 1, wherein the step of computing the final pixel value comprises performing a weighted average calculation.

12. The method of claim 1, further comprising the step of storing the first set of intermediate color values in a memory buffer.

13. The method of claim 1, further comprising the steps of:
   generating a second sample grid based on a different set of camera parameters, wherein the second sample grid includes a different set of samples corresponding to the pixels in the graphics image;
   rendering the second sample grid to determine a color value for each sample included in the different set of samples; and
   sampling the second sample grid to determine a second set of intermediate color values for the pixels in the graphics image based on the color values for each sample in the different set of samples.

14. The method of claim 13, wherein the step of computing the final pixel value for the first pixel is further based on a second intermediate color value included in the second set of intermediate color values corresponding to the first pixel.

15. The method of claim 14, wherein the step of computing the final pixel value for the first pixel comprises the steps of:
   adding the first intermediate color value and the second intermediate color value to compute a summed intermediate color value; and
   dividing the summed intermediate color value by a number of generated sample grids.

16. A computing device configured to generate color values for pixels in a graphics image, the computing device comprising:

a central processing unit coupled to a system memory; and
a graphics processing unit coupled to the central processing unit and including a graphics rendering pipeline configured to:
- receive an initial location of a pixel grid associated with the graphics image,
- receive a first set of camera parameters via a first user interface displayed on a display device,
- compute a second set of camera parameters based on configuration information related to chances in the location of the pixel grid and the initial location of the pixel grid;
- combine the first set of camera parameters and the second set of camera parameters to determine a new location of the pixel grid generate a first sample grid based on new location of the pixel grid, wherein the first sample grid includes a set of samples corresponding to the pixels in the graphics image,
- render the first sample grid to determine a color value for each sample included in the set of samples,
- sample the first sample grid to determine a first set of intermediate color values for the pixels in the graphics image based on the color values for each sample in the set of samples, and
- compute a final pixel value for a first pixel in the graphics image based on a first intermediate color value included in the first set of intermediate color values associated with the first pixel.

17. The computing device of claim 16, wherein a first camera parameter is a translation parameter.

18. The computing device of claim 16, wherein a first camera parameter is a rotation parameter.

19. The computing device of claim 16, wherein a first camera parameter is a scaling parameter.

20. The computing device of claim 16, wherein a first camera parameter is a skewing parameter.

21. The computing device of claim 16, wherein the first set of camera parameters includes a combination of translation, rotation, scaling and/or skewing parameters.

22. The computing device of claim 16, wherein the graphics rendering pipeline is configured to sample each sample grid by performing a point sampling operation.

23. The computing device of claim 16, wherein the graphics rendering pipeline is configured to sample each sample grid by performing a bilinear sampling operation.

24. The computing device of claim 16, wherein the graphics rendering pipeline is configured to compute the final pixel value by performing a weighted average computation.

25. The computing device of claim 16, wherein the graphics processing unit includes a plurality of graphics rendering pipelines.

26. The computing device of claim 16, wherein the graphics rendering pipeline is configured to store the first set of intermediate color values in a memory buffer.

27. The computing device of claim 16, wherein the graphics rendering pipeline is further configured to:
- generate a second sample grid based on a different set of camera parameters, wherein the second sample grid includes a different set of samples corresponding to the pixels in the graphics image;
- render the second sample grid to determine a color value for each sample included in the different set of samples; and
- sample the second sample grid to determine a second set of intermediate color values for the pixels in the graphics image based on the color values for each sample in the different set of samples.

28. The computing device of claim 27, wherein the step of computing the final pixel value for the first pixel is further based on a second intermediate color value included in the second set of intermediate color values corresponding to the first pixel.

29. The computing device of claim 28, wherein the step of computing the final pixel value for the first pixel comprises the steps of:
- adding the first intermediate color value and the second intermediate color value to compute a summed intermediate color value; and
- dividing the summed intermediate color value by a number of generated sample grids.

* * * * *